US007658604B1

(12) United States Patent
Yang et al.

(10) Patent No.: US 7,658,604 B1
(45) Date of Patent: Feb. 9, 2010

(54) SPECIFIC-LIGHT-CURED AND PRESSURE-DIFFERENTIAL EMBOSSING APPARATUS

(75) Inventors: Sen-Yeu Yang, Taipei (TW); Fang-Sung Cheng, Taipei (TW); Tzu-Chien Huang, Taipei (TW); Po-Hsun Huang, Taipei (TW); Jian-Wei Chen, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 12/255,401

(22) Filed: Oct. 21, 2008

(30) Foreign Application Priority Data

Jul. 15, 2008 (TW) .............................. 97126712 A

(51) Int. Cl.
*B29C 59/00* (2006.01)
*B29C 43/00* (2006.01)
*B29B 13/08* (2006.01)

(52) U.S. Cl. ..................... 425/385; 425/389; 425/174.4
(58) Field of Classification Search ................. 425/385, 425/174.4, 389; 264/293
See application file for complete search history.

(56) References Cited

U.S. PATENT DOCUMENTS 4,233,261 A * 11/1980 Mijnheer .................... 264/293

| 6,994,541 | B2 * | 2/2006 | Chung et al. ................. 425/385 |
| 7,195,734 | B2 * | 3/2007 | Heidari ........................ 264/667 |
| 2004/0131718 | A1 * | 7/2004 | Chou et al. .................. 425/385 |
| 2005/0275125 | A1 * | 12/2005 | Kawakami et al. .......... 264/40.5 |
| 2007/0158866 | A1 * | 7/2007 | Wu ............................ 264/1.33 |

OTHER PUBLICATIONS

Huang et al., "Fabrication of large area resin microlens arrays using gas-assisted ultaviolet embossing," Optics Express, Mar. 3, 2008, pp. 3041-3048, vol. 16—No. 5.

* cited by examiner

*Primary Examiner*—Maria Veronica D Ewald
(74) *Attorney, Agent, or Firm*—Muncy, Geissler, Olds & Lowe, PLLC

(57) ABSTRACT

A specific-light-cured and pressure-differential embossing apparatus for embossing a specific-light-cured layer on a substrate includes a housing assembly, a mold, an elastic driving module, a pressure-difference generating module, and a specific light providing module. The substrate and the mold are disposed in a chamber of the housing assembly. The mold faces the specific-light-cured layer on the substrate. The elastic driving module is disposed in the chamber to divide the chamber into a first sub-chamber and a second sub-chamber. The pressure-difference generating module, connected to the first sub-chamber and the second sub-chamber, generates a pressure difference between the first sub-chamber and the second sub-chamber, and drives the elastic driving module to move and thus to drive the mold to move and press the specific-light-cured layer. The specific light providing module provides specific light to the specific-light-cured layer to cure the specific-light-cured layer.

17 Claims, 7 Drawing Sheets

SPECIFIC-LIGHT-CURED AND PRESSURE-DIFFERENTIAL EMBOSSING APPARATUS

This application claims priority of No. 097126712 filed in Taiwan R.O.C. on Jul. 15, 2008 under 35 USC 119, the entire content of which is hereby incorporated by reference.

BACKGROUND OF THE INVENTION

1. Field of Invention

The invention relates in general to a pressure-differential embossing apparatus, and more particularly to a specific-light-cured and pressure-differential embossing apparatus.

2. Related Art

The development of a micro-electro-mechanical-system (MEMS) has been greatly noted all over the world. The MENS includes mechanical technology, optical technology, electronic technology, material technology, control technology and chemical technology integrated together. It is preferred to adopt this technology to miniaturize the product, to enhance the performance, quality, reliability and additional values of this product, and to decrease the manufacturing cost and the energy consumption so that the applications in production and life become more convenient.

A micro hot embossing method pertains to the main micro-structure duplication technology in the field of MEMS, wherein the micro-structure represents the structure with the dimension of microns or nanometers. The micro-structure may directly serve as a component or may be used through other manufacturing processes. Thus, the manufacturing processes are simple and the products can be manufactured in a batch. So, the throughput of the MENS products can be increased if the molding precision and quality of the facture are effectively controlled.

In the past, the micro hot embossing process is performed by using an oil cylinder, a pneumatic cylinder, a motor/screw rod or any other pressing mechanism to directly drive a pressing plate to move toward a plastic material and a mold. However, this method may encounter the problem of the uneven distribution of the pressing forces, and the problem becomes more serious when the large-area embossing process is being performed so that the dimension and duplication precision of the facture are influenced. In addition, the hot embossing process has to heat the to-be-embossed target and has to control the temperature of the target so that the provided pressing forces are further influenced and another interference factor is caused. In addition, the facture may have residual thermal stresses.

SUMMARY OF THE INVENTION

It is therefore an object of the invention to provide a specific-light-cured and pressure-differential embossing apparatus for manufacturing a large-area micro-structure with the enhanced precision according to the isotropic and isopiestic properties of the fluid.

The invention achieves the above-identified object by providing a specific-light-cured and pressure-differential embossing apparatus for embossing a specific-light-cured layer on a substrate. The embossing apparatus includes a housing assembly, a mold, an elastic driving module, a pressure-difference generating module and a specific light providing module. The housing assembly has a chamber. The substrate is disposed in the chamber of the housing assembly. The mold is disposed in the chamber of the housing assembly and faces the specific-light-cured layer on the substrate. The elastic driving module is disposed in the chamber to divide the chamber into a first sub-chamber and a second sub-chamber. The pressure-difference generating module is connected to the first sub-chamber and the second sub-chamber, and generates a pressure difference between the first sub-chamber and the second sub-chamber to drive the elastic driving module to move and thus to drive the mold to move and press the specific-light-cured layer. The specific light providing module provides specific light to the specific-light-cured layer to cure the specific-light-cured layer.

According to the specific-light-cured and pressure-differential embossing apparatus of the invention, it is possible to manufacture a large-area micro-structure, and the emboss process may be performed at the room temperature and the low pressure. Thus, the processing time can be effectively shortened, and the energy can be saved. Also, it is possible to prevent the problem of thermal stress in the conventional injection molded facture.

Further scope of the applicability of the present invention will become apparent from the detailed description given hereinafter. However, it should be understood that the detailed description and specific examples, while indicating preferred embodiments of the invention, are given in a way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given in a way of illustration only, and thus are not limitative to the present invention.

DETAILED DESCRIPTION OF THE INVENTION

The present invention will be apparent from the following detailed description, which proceeds with reference to the accompanying drawings, wherein the same references relate to the same elements.

The pressure-differential embossing apparatus of the invention may be applied to an electronic product, such as a DVD player, a digital camera, a camcorder or an element, a mirror structure element, a micro-lens element, or a diffraction optical device, having a surface structure. The invention can simply and rapidly finish the embossing procedure of the large-area micro-structure at the room temperature and low pressure according to the evenly distributed gas pressure and the ultra-violet ray curing technique. Thus, the invention can greatly shorten the processing time and greatly reduce the cost, so that it can solve the conventional problems of the deformation of the embossing structure and the uneven distribution of the embossed residual layer. In addition, the generation of the residual bubbles can be effectively suppressed by a vacuuming device and a spring carrier.

Figure 1:
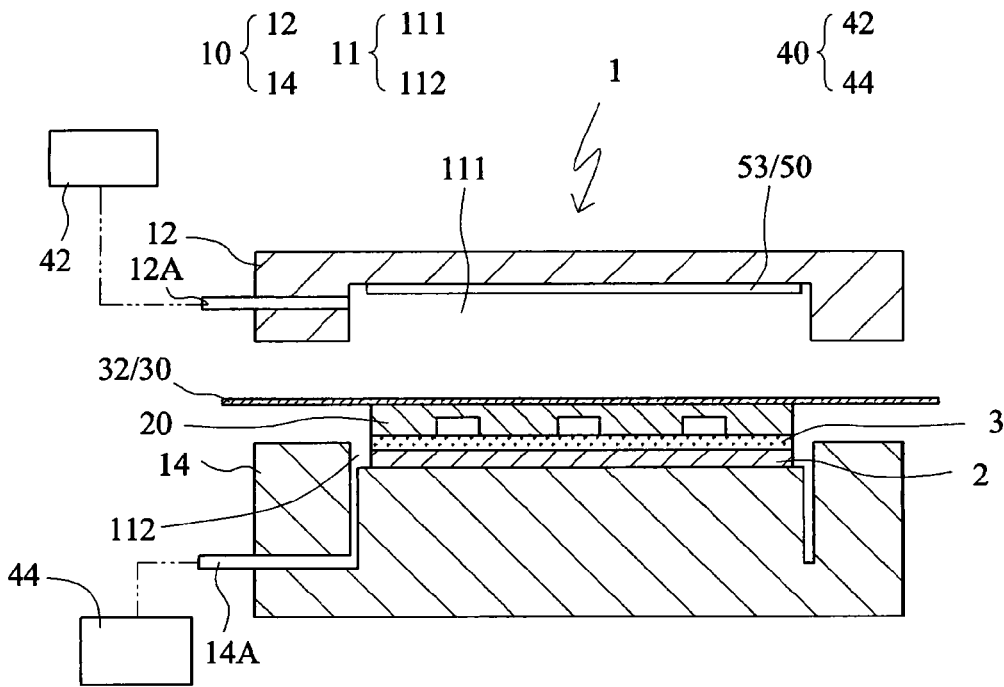
FIGS. 1 and 2 show first and second states of a pressure-differential embossing apparatus according to the first embodiment of the invention.
Figure 2:
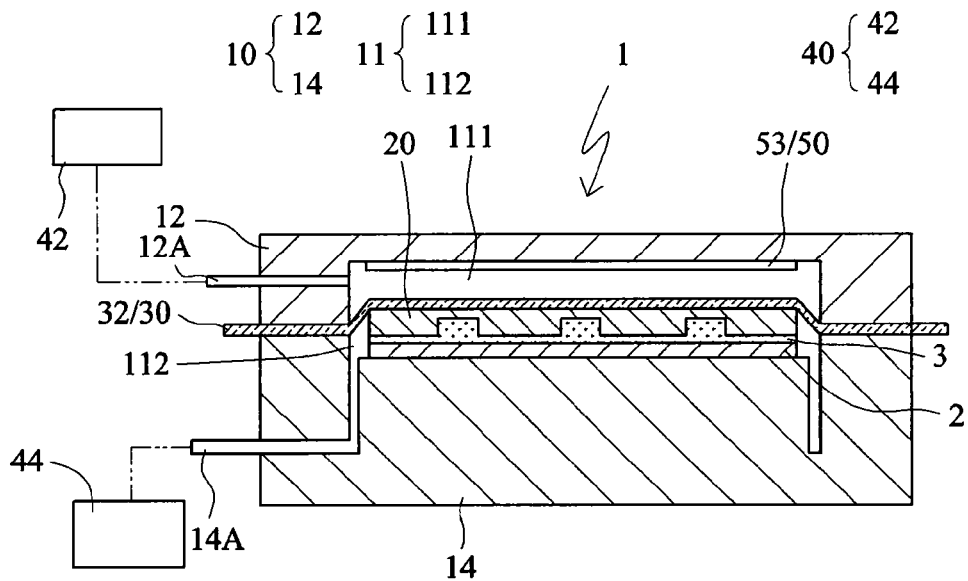

FIGS. 1 and 2 show first and second states of pressure-differential embossing apparatus 1 according to the first embodiment of the invention. Referring to FIGS. 1 and 2, the specific-light-cured and pressure-differential embossing apparatus 1 of this embodiment is used to emboss a specific-light-cured layer 3 disposed on the substrate 2. The material of the specific-light-cured layer 3 is especially an ultra-violet ray cured resin, which is cured after being illuminated by an ultra-violet ray. However, the material of the specific-light-cured layer 3 may also be any other material, which is cured after being illuminated by any other specific light.

The embossing apparatus 1 includes a housing assembly 10, a mold 20, an elastic driving module 30, a pressure-difference generating module 40 and a specific light providing module 50.

The housing assembly 10 has a chamber 11. The substrate 2 is disposed in the chamber 11 of the housing assembly 10. In this embodiment, the housing assembly 10 includes a first housing 12 and a second housing 14, and the substrate 2 is fixed to the second housing 14.

The mold 20 is disposed in the chamber 11 of the housing assembly 10 and faces the specific-light-cured layer 3 on the substrate 2.

The elastic driving module 30 is disposed in the chamber 11 to divide the chamber 11 into a first sub-chamber 111 and a second sub-chamber 112. The elastic driving module 30 includes an air-tight film 32, which is clamped between the first housing 12 and the second housing 14 to divide the chamber 11 into the first sub-chamber 111 and the second sub-chamber 112. The mold 20 is fixed to the air-tight film 32 and thus driven by the air-tight film 32.

The pressure-difference generating module 40 is connected to the first sub-chamber 111 and the second sub-chamber 112, and generates a pressure difference between the first sub-chamber 111 and the second sub-chamber 112 to drive the elastic driving module 30 to move, and thus to drive the mold 20 to move and to press the specific-light-cured layer 3. The pressure-difference generating module 40 includes a fluid supplying device 42, which is connected to the first sub-chamber 111 and an inlet 12A of the first housing 12, for supplying a first fluid to the first sub-chamber 111. The first fluid may be air, an inert gas and a liquid. In addition, the pressure-difference generating module 40 may further include a fluid extracting device 44, which is connected to the second sub-chamber 112 and an outlet 14A of the second housing 14, for extracting a second fluid from the second sub-chamber 112. The second fluid may also be air, an inert gas and a liquid, and may be the same as the first fluid. It is to be noted that the fluid extracting device 44 or the fluid supplying device 42 may be omitted as long as the second sub-chamber 112 or the first sub-chamber 111 may communicate with the outside. The pressure-difference generating module 40 may have only the fluid extracting device 44 or only the fluid supplying device 42.

Figure 9:
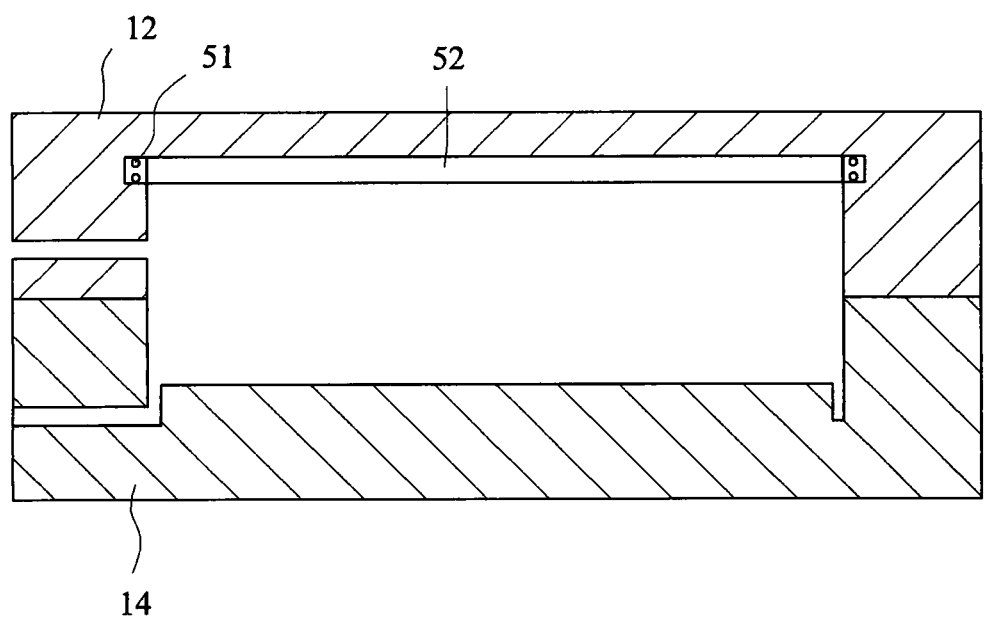
FIGS. 9 to 14 show various examples of the specific light providing module according to the invention.
Figure 11:
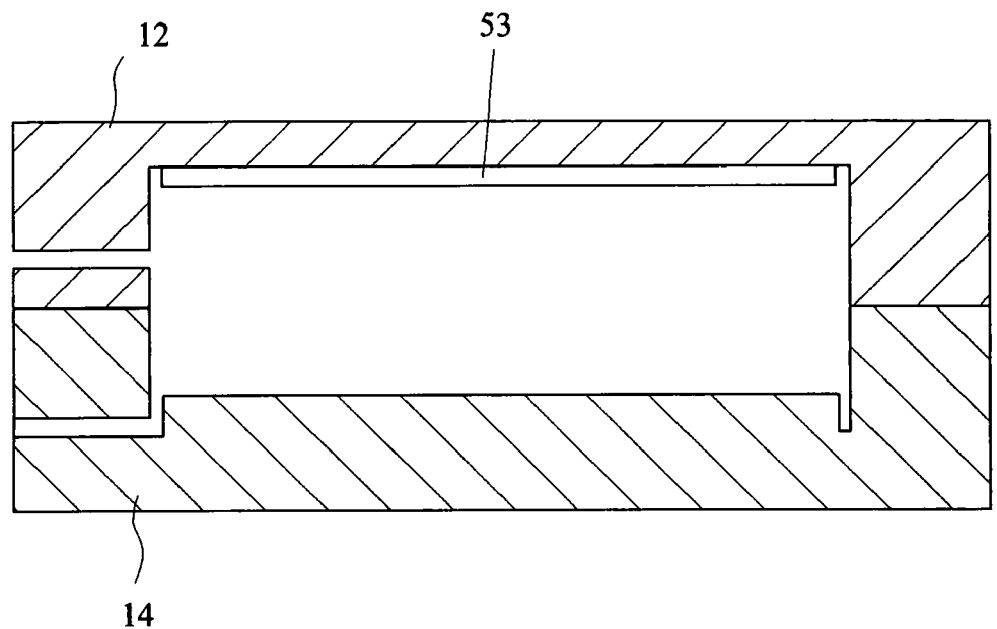
Figure 12:
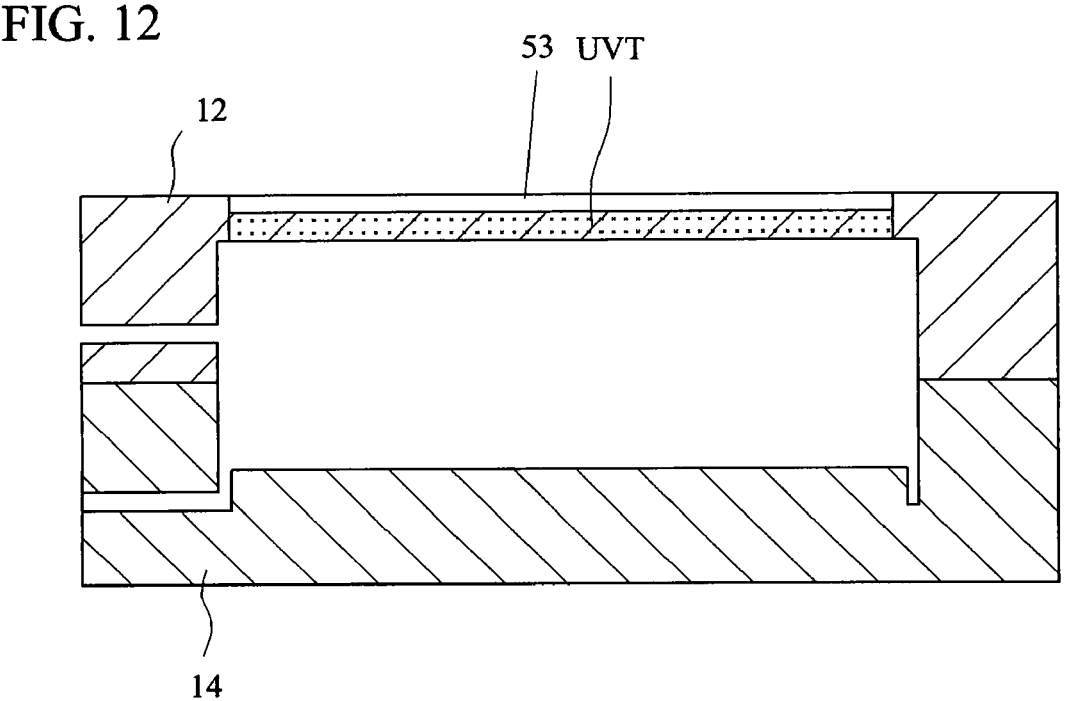
Figure 13:
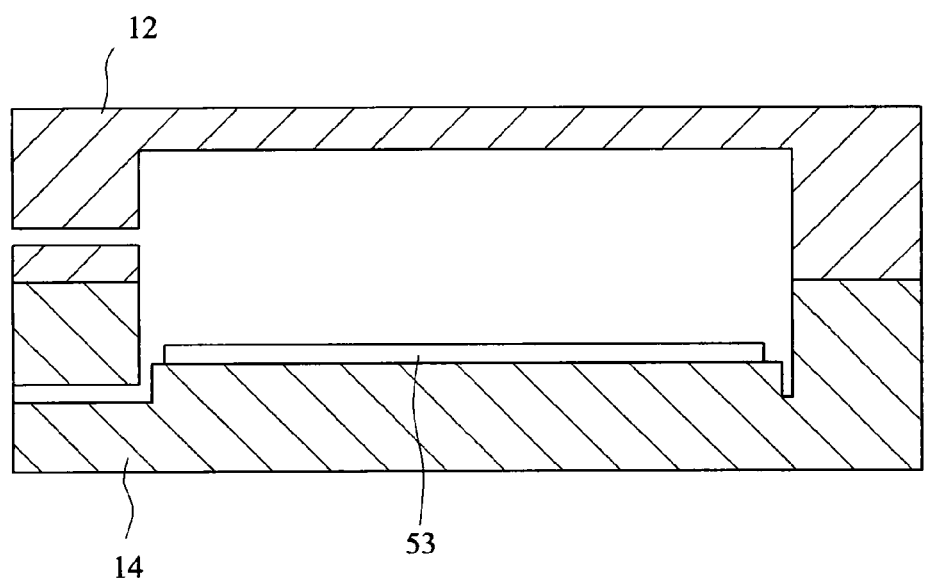
Figure 14:
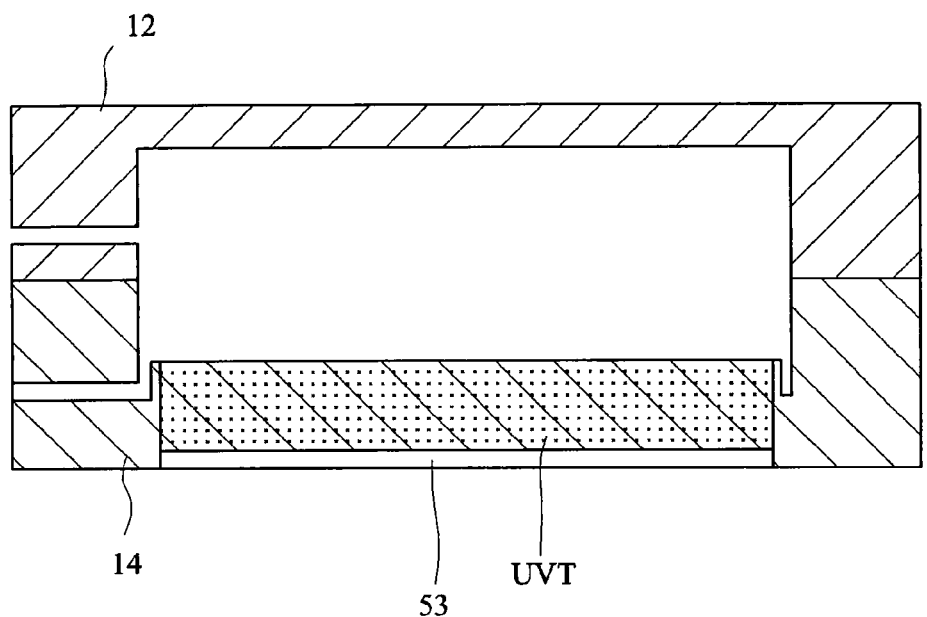

The specific light providing module 50 provides specific light to the specific-light-cured layer 3 to cure the specific-light-cured layer 3. The specific light providing module 50 is fixed to the first housing 12 and disposed in the chamber 11. The specific light providing module 50 includes a two-dimensional light source or linear light source 53. Alternatively, the specific light providing module 50 may include an ultra-violet ray mercury lamp or an ultra-violet ray LED, as shown in FIGS. 9 and 11. As shown in FIG. 9, the specific light providing module 50 includes a point light source 51 and a light guiding element 52. Alternatively, the specific light providing module 50 may be fixed to the first housing 12 and disposed outside the chamber 11, as shown in FIG. 12. Alternatively, the specific light providing module 50 may be fixed to the second housing 14 and disposed inside the chamber 11, as shown in FIG. 13. Alternatively, the specific light providing module 50 may be fixed to the second housing 14 and disposed outside the chamber 11, as shown in FIG. 14.

The operations of this embodiment will be described in the following. First, the mold 20, the specific-light-cured layer 3 and the substrate 2 are aligned and stacked together. Next, the air-tight film 32 is provided to cover the mold 20. Then, the first housing 12 is placed on the second housing 14 via the air-tight film 32 to form the chamber 11. Next, the fluid extracting device 44 is provided to discharge the second sub-chamber 112, while the fluid supplying device 42 is provided to charge the second sub-chamber 112 so that the pressure difference between the two sub-chambers is adjusted to the shaping pressure of the specific-light-cured layer 3. At this time, the specific-light-cured layer 3 withstands the pressure and starts to fill into the cavities of the mold 20. After a period of time has elapsed such that the cavities are completely filled, the specific light providing module 50 provides the specific light to illuminate and cure the specific-light-cured layer 3. Next, the first housing 12 and the second housing 14 are separated, and the embossed product can be taken out. It is to be noted that the air-tight film 32 and the mold 20 may be transmitted by the specific light so that the specific-light-cured layer 3 can be cured in this embodiment.

Figure 3:
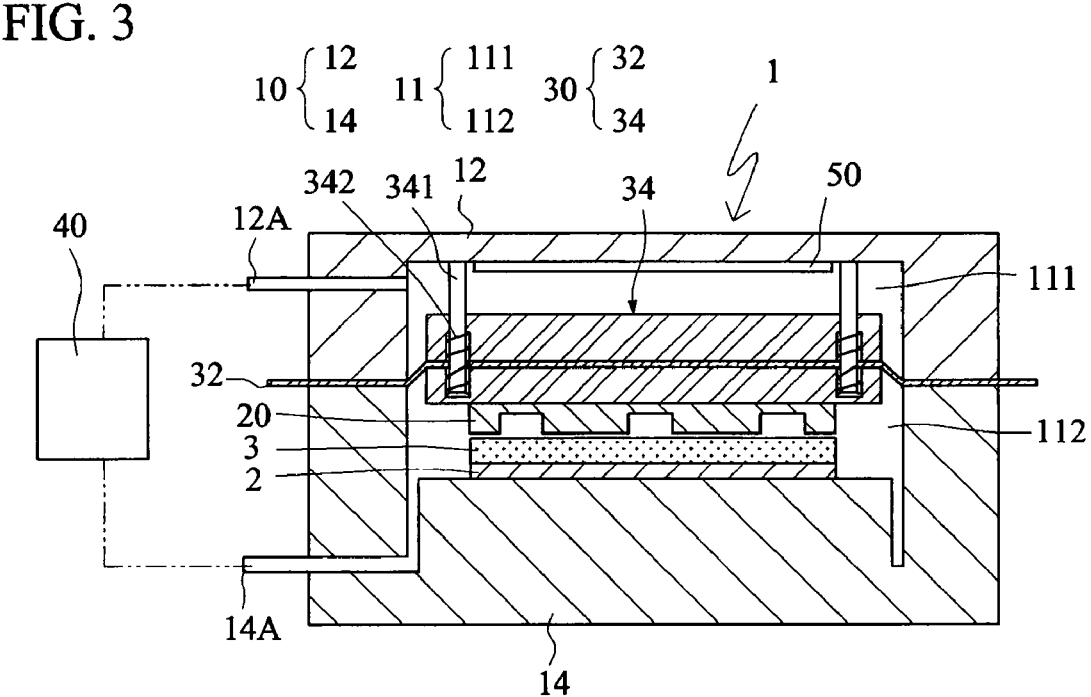
FIGS. 3 and 4 show first and second states of a pressure-differential embossing apparatus according to the second embodiment of the invention.
Figure 4:
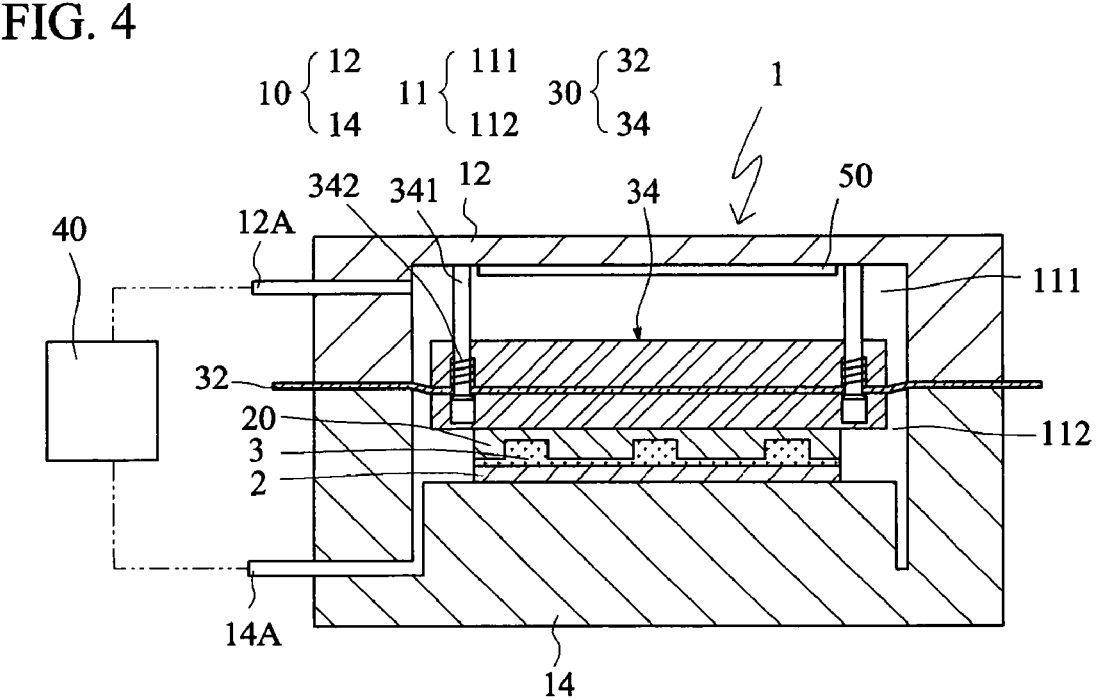

FIGS. 3 and 4 show first and second states of a pressure-differential embossing apparatus according to the second embodiment of the invention. Referring to FIGS. 3 and 4, the elastic driving module 30 further includes a spring carrier 34 fixed to the first housing 12 and the air-tight film 32. The spring carrier 34 has two guiding rods 341 and two springs 342, which are assembled to form the structure shown in FIG. 3. The spring carrier 34 may change the elastic constant of the elastic driving module 30 and homogenize the pressure of the elastic driving module 30 applied to the mold 20 so as to prevent the residual bubbles from being generated during the embossing process. In this embodiment, the spring carrier 34, the air-tight film 32 and the mold 20 may be transmitted by the specific light so that the specific-light-cured layer 3 can be cured.

Figure 5:
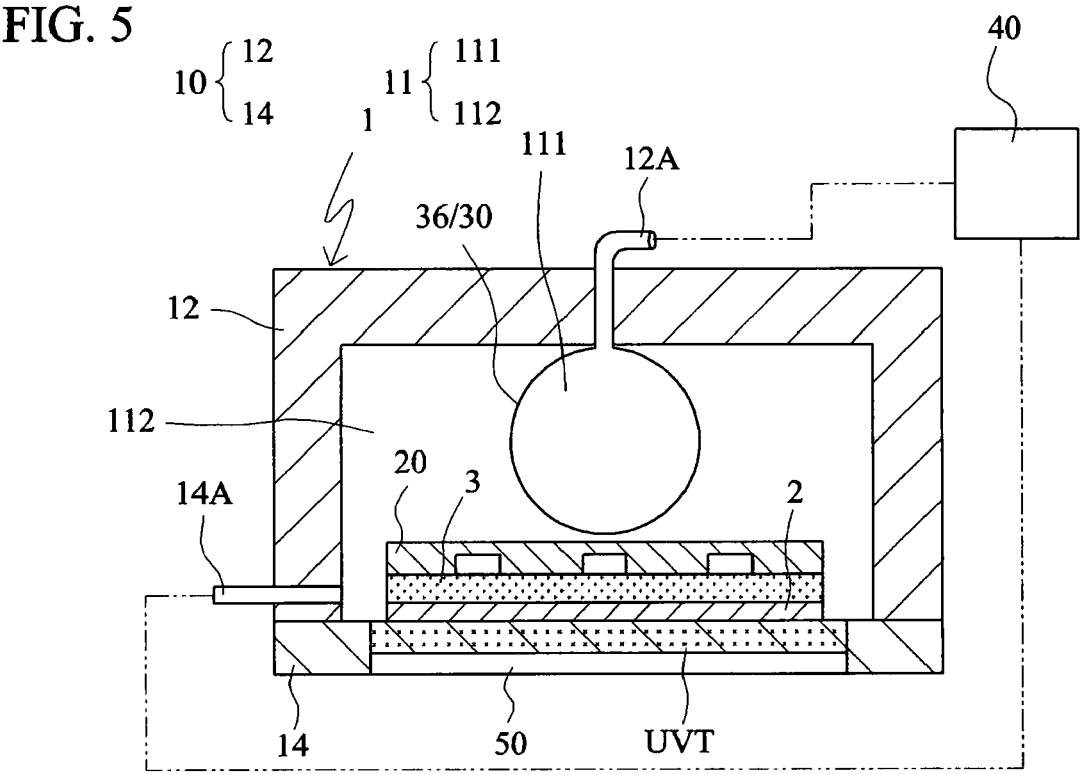
FIGS. 5 and 6 show first and second states of a pressure-differential embossing apparatus according to the third embodiment of the invention.
Figure 6:
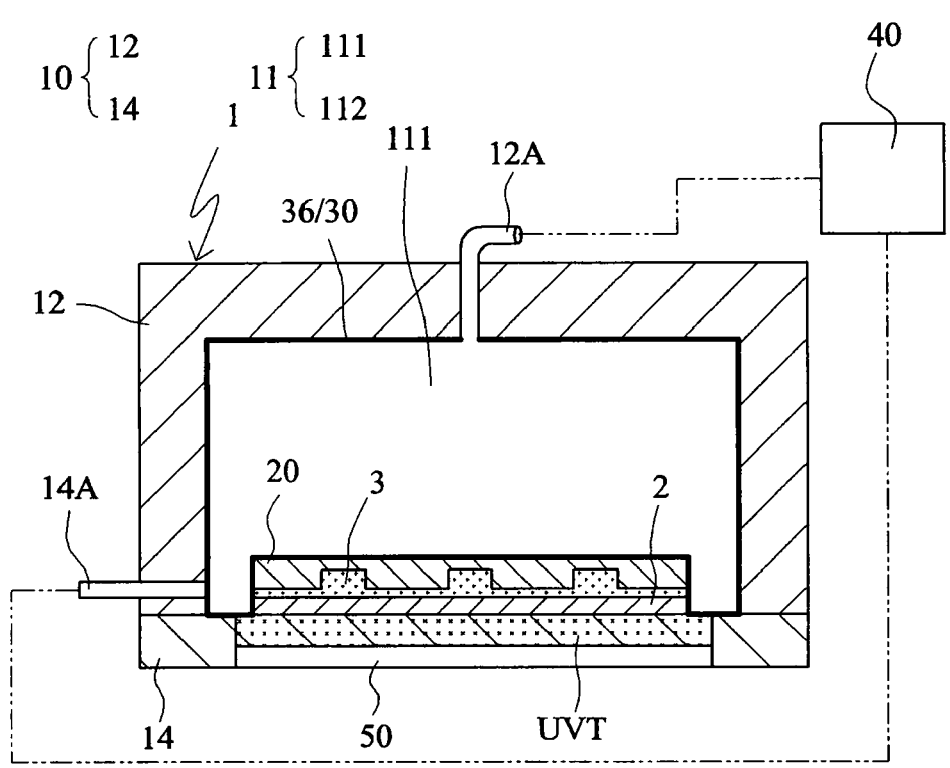

FIGS. 5 and 6 show first and second states of a pressure-differential embossing apparatus according to the third embodiment of the invention. Referring to FIGS. 5 and 6, the elastic driving module 30 includes a bladder 36, which is disposed in the chamber 11 to divide the chamber 11 into the first sub-chamber 111 and the second sub-chamber 112. The first sub-chamber 111 is disposed in the bladder 36, and the second sub-chamber 112 is disposed outside the bladder 36. The mold 20 is disposed on the specific-light-cured layer 3 and is driven by the bladder 36, which gradually expands. The pressure-difference generating module 40 may charge the bladder 36 to expand the bladder 36. In this embodiment, a specific light transmittable portion UVT of the second housing 14 and the substrate 2 may be transmitted by the specific light so that the specific-light-cured layer 3 can be cured.

Figure 7:
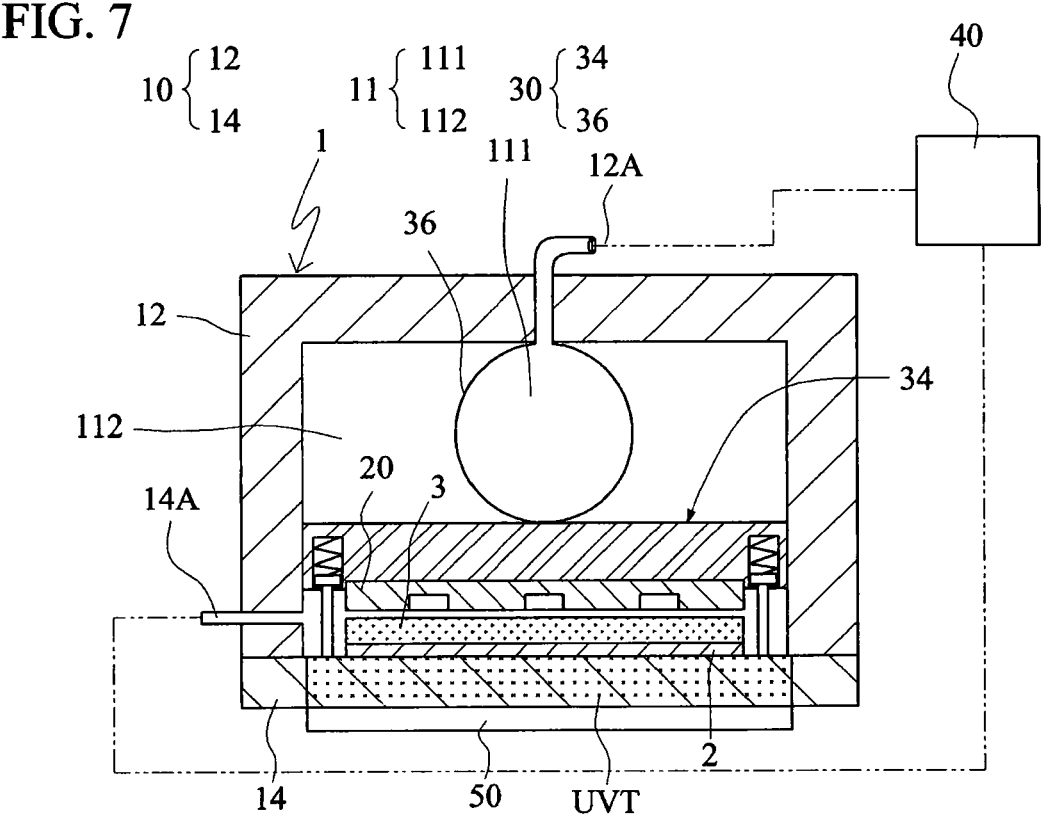
FIGS. 7 and 8 show first and second states of a pressure-differential embossing apparatus according to the fourth embodiment of the invention.
Figure 8:
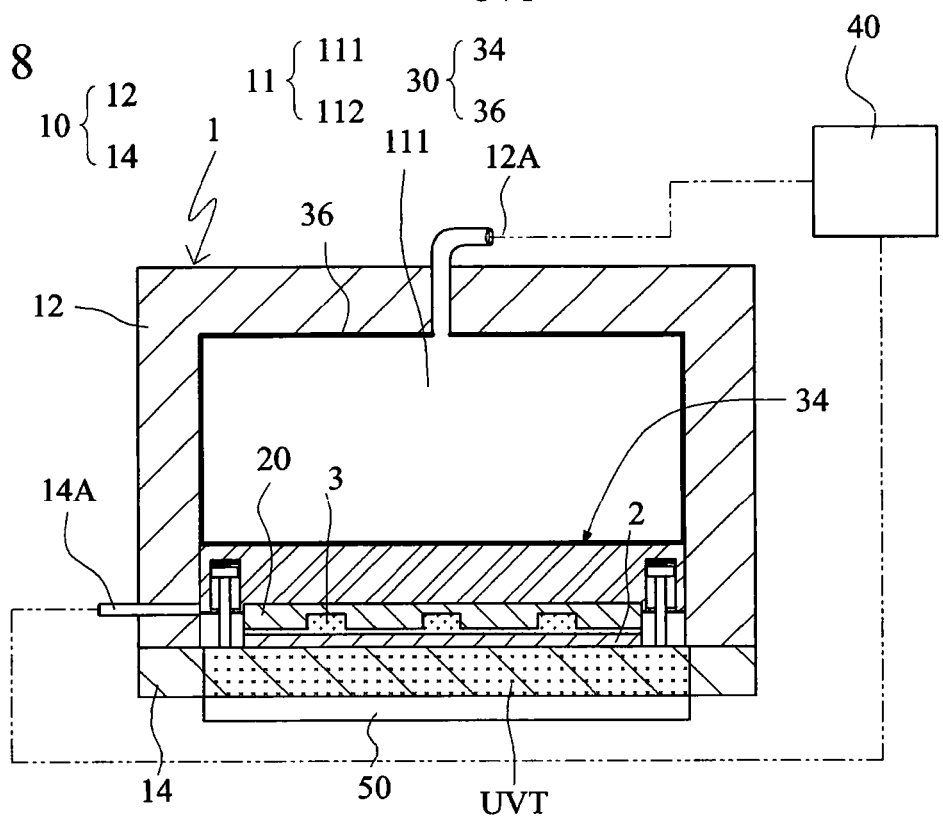

FIGS. 7 and 8 show first and second states of a pressure-differential embossing apparatus according to the fourth embodiment of the invention. Referring to FIGS. 7 and 8, the elastic driving module 30 includes a bladder 36 and a spring carrier 34. The bladder 36 is disposed in the chamber 11 to divide the chamber 11 into the first sub-chamber 111 and the second sub-chamber 112. The first sub-chamber 111 is disposed inside the bladder 36, the second sub-chamber 112 is disposed outside the bladder 36, and the mold 20 is fixed to the spring carrier 34. The spring carrier 34 is driven by the bladder 36, which gradually expands, to press the specific-light-cured layer 3. In this embodiment, the specific light transmittable portion UVT of the second housing 14 and the substrate 2 may be transmitted by the specific light so that the specific-light-cured layer 3 can be cured.

Figure 10:
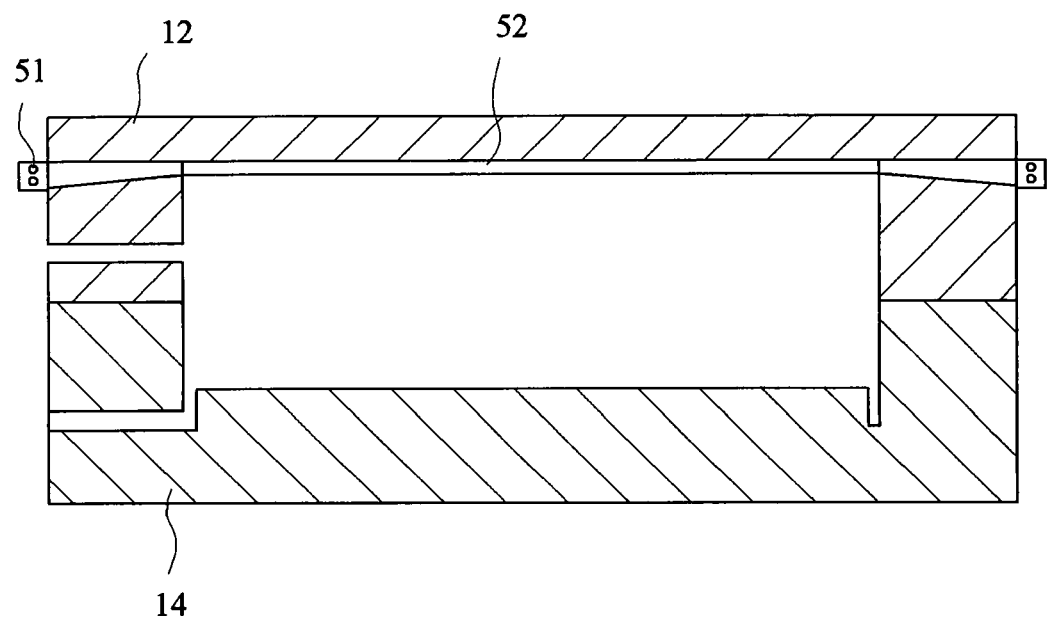

FIGS. 9 to 14 show various examples of the specific light providing module according to the invention. The specific light providing module 50 may be disposed in many ways. As shown in FIG. 9, the specific light providing module 50 is fixed in the chamber 11, and includes the point light source 51 and the light guiding element 52. For example, the point light source 51 may be the ultra-violet ray LED, and the light guiding element 52 may be a light guide rod or a light guide plate. As shown in FIG. 10, the specific light providing module 50 includes the point light source 51 and the light guiding element 52. The point light source 51 is fixed outside the chamber 11, and the light guiding element 52 is fixed inside the chamber 11. As shown in FIG. 11, the two-dimensional light source or the linear light source 53 is fixed to the first housing 12 and disposed inside the chamber 11. As shown in FIG. 12, the two-dimensional light source or the linear light source 53 is fixed to the first housing 12 and disposed outside the chamber 11, and the specific light transmittable portion UVT of the first housing 12 may be transmitted by the specific light. As shown in FIG. 13, the two-dimensional light source or the linear light source 53 is fixed to the second housing 14, and disposed inside the chamber 11. As shown in FIG. 14, the two-dimensional light source or the linear light source 53 is fixed to the second housing 14, and disposed outside the chamber 11, and the specific light transmittable portion UVT of the second housing 14 may be transmitted by the specific light.

According to the specific-light-cured and pressure-differential embossing apparatus of the invention, it is possible to manufacture a large-area micro-structure, and the emboss process may be performed at the room temperature and low pressure. Thus, the processing time can be effectively shortened, and the energy can be saved. Also, it is possible to prevent the problem of thermal stress in the conventional injection molded facture. This is because the large-scale oil cylinder is needed to manufacturing the large-area microstructure according to the conventional hot embossing process. So, the cost is not low and the problem of the unevenly applied forces tends to occur so that the embossing defect is caused. The invention is to emboss the large-area microstructure according to the isotropic and isopiestic properties of the fluid so that the evenness of duplication of the microstructure can be enhanced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A specific-light-cured and pressure-differential embossing apparatus for embossing a specific-light-cured layer on a substrate, the embossing apparatus comprising:
   a housing assembly having a chamber, wherein the substrate is disposed in the chamber of the housing assembly;
   a mold disposed in the chamber of the housing assembly and facing the specific-light-cured layer on the substrate;
   an elastic driving module disposed in the chamber to divide the chamber into a first sub-chamber and a second sub-chamber;
   a pressure-difference generating module, connected to the first sub-chamber and the second sub-chamber, for generating a pressure difference between the first sub-chamber and the second sub-chamber to drive the elastic driving module to move and thus to drive the mold to move and to press the specific-light-cured layer; and
   a specific light providing module for providing specific light to the specific-light-cured layer to cure the specific-light-cured layer, wherein the housing assembly comprises a first housing and a second housing, the substrate is fixed to the second housing, and the specific light providing module is fixed to the first housing and disposed inside the chamber.

2. The apparatus according to claim 1, wherein the elastic driving module comprises an air-tight film clamped between the first housing and the second housing to divide the chamber into the first sub-chamber and the second sub-chamber, and the mold is fixed to the air-tight film and driven by the air-tight film.

3. The apparatus according to claim 2, wherein the elastic driving module further comprises a spring carrier fixed to the first housing and the air-tight film.

4. The apparatus according to claim 1, wherein the specific light is an ultra-violet ray.

5. The apparatus according to claim 1, wherein the specific light providing module comprises a point light source and a light guiding element.

6. The apparatus according to claim 1, wherein the specific light providing module comprises a two-dimensional light source or a linear light source.

7. The apparatus according to claim 1, wherein the specific light providing module comprises an ultra-violet ray mercury lamp or an ultra-violet ray light-emitting diode (LED).

8. The apparatus according to claim 1, wherein the elastic driving module comprises a bladder, disposed in the chamber, for dividing the chamber into the first sub-chamber inside the bladder and the second sub-chamber outside the bladder, and the mold is disposed on the specific-light-cured layer and driven by the bladder, which gradually expands.

9. The apparatus according to claim 1, wherein the elastic driving module comprises a bladder and a spring carrier, the bladder is disposed in the chamber to divide the chamber into the first sub-chamber inside the bladder and the second sub-chamber outside the bladder, the mold is fixed to the spring carrier, and the spring carrier is driven by the bladder, which gradually expands, to press the specific-light-cured layer.

10. A specific-light-cured and pressure-differential embossing apparatus for embossing a specific-light-cured layer on a substrate, the embossing apparatus comprising:
   a housing assembly having a chamber, wherein the substrate is disposed in the chamber of the housing assembly;
   a mold disposed in the chamber of the housing assembly and facing the specific-light-cured layer on the substrate;
   an elastic driving module disposed in the chamber to divide the chamber into a first sub-chamber and a second sub-chamber;
   a pressure-difference generating module, connected to the first sub-chamber and the second sub-chamber, for generating a pressure difference between the first sub-chamber and the second sub-chamber to drive the elastic driving module to move and thus to drive the mold to move and to press the specific-light-cured layer; and a specific light providing module for providing specific light to the specific-light-cured layer to cure the specific-light-cured layer, wherein the housing assembly comprises a first housing and a second housing, the substrate is fixed to the second housing, and the pressure-difference generating module comprises a fluid supplying device, connected to the first sub-chamber and an inlet of the first housing, for supplying a first fluid to the first sub-chamber.

11. The apparatus according to claim 10, wherein the first fluid is selected from the group consisting of air, an inert gas and a liquid.

12. The apparatus according to claim 10, wherein the pressure-difference generating module further comprises a fluid extracting device connected to the second sub-chamber and an outlet of the second housing, for extracting a second fluid from the second sub-chamber.

13. The apparatus according to claim 12, wherein each of the first fluid and the second fluid is selected from the group consisting of air, an inert gas and a liquid.

14. The apparatus according to claim 12, wherein the first fluid is the same as the second fluid.

15. The apparatus according to claim 10, wherein the specific light providing module is fixed to the first housing and disposed outside the chamber.

16. The apparatus according to claim 10, wherein the specific light providing module is fixed to the second housing and disposed inside the chamber.

17. The apparatus according to claim 10, wherein the specific light providing module is fixed to the second housing and disposed outside the chamber.

* * * * *